United States Patent [19]

Dodia et al.

[11] Patent Number: 4,908,260

[45] Date of Patent: Mar. 13, 1990

[54] FLAME-RETARDANT, VAPOR-PERMEABLE WATERPROOF STRUCTURE

[75] Inventors: Harshad R. Dodia, Kennett Square, Pa.; George J. Ostapchenko, Wilmington, Del.

[73] Assignee: E. I. Du Pont de Nemours and Company, Wilmington, Del.

[21] Appl. No.: 241,365

[22] Filed: Sep. 7, 1988

[51] Int. Cl.$^4$ .......................... B32B 5/24; B32B 5/32; B32B 27/18; B32B 27/36

[52] U.S. Cl. .................................. 428/215; 428/216; 428/242; 428/252; 428/253; 428/283; 428/287; 428/288; 428/315.7; 428/315.9; 428/317.7; 428/340; 428/341; 428/475.2; 428/480; 428/920

[58] Field of Search ............... 428/215, 216, 242, 252, 428/253, 283, 287, 288, 315.7, 315.9, 317.7, 340, 341, 475.2, 480, 920

[56] References Cited

U.S. PATENT DOCUMENTS

| | | | |
|---|---|---|---|
| 3,760,003 | 9/1973 | Asadorian et al. | 524/371 |
| 4,166,743 | 9/1979 | Wortmann et al. | 252/8.1 |
| 4,284,682 | 8/1981 | Tschirch et al. | 428/263 |
| 4,395,511 | 7/1983 | Tschirch et al. | 524/371 |
| 4,521,557 | 6/1985 | McKenna | 524/94 |
| 4,582,866 | 4/1986 | Shain | 524/94 |
| 4,725,481 | 2/1988 | Ostapchenko | 428/213 |
| 4,750,443 | 6/1988 | Blaustein et al. | 112/420 |
| 4,826,899 | 5/1989 | Rees | 524/94 |

FOREIGN PATENT DOCUMENTS 0149190  7/1985  European Pat. Off. .

Primary Examiner—James C. Cannon

[57] ABSTRACT

A flame resistant copolyetherester elastomer film composition comprising (a) 60-85 weight percent of a hydrophilic copolyetherester elastomer film having a thickness of 0.3-1.6 mils, a water vapor transmission rate of at least 7,000 gm.mil/m$^2$/24 hours and an elongation of at least 600% with said hydrophilic elastomer film consisting essentially of a multiplicity of long chain ester units and short chain ester units joined head-to-tail through ester linkages wherein copolyetherester elastomer contains about 25-80 weight percent short chain ester units, and (b) 15-40 weight percent of a flame retardant component comprised of 37.5 to 100 weight percent of at least one brominated aromatic compound selected from the group consisting of tetradecabromodiphenoxybenzene, ethylenebistetrabromophthalimide, and decabromodiphenoxybenzene, wherein the ratio of the thickness of the hydrophilic copolyetherester film to the weight percent, as based upon the weight of components (a) and (b), of the brominated aromatic compound is less tha 0.04. The flame retardant compound may be further comprised of no more than 62.5 weight percent of at least one compound selected from the group consisting of metal oxides, tricresylphosphate, aluminum trihydrate, and zinc borate.

22 Claims, No Drawings

FLAME-RETARDANT, VAPOR-PERMEABLE WATERPROOF STRUCTURE

BACKGROUND OF THE INVENTION

1. Technical Field

The present invention relates to waterproof hydrophilic, vapor permeable copolyetherester films that are flame resistant.

Copolyetheresters are well known and have enjoyed continued and increasing commercial success. These are especially useful resins because they are quite varied in consistency, ranging from a soft elastomer to semi-rigid plastics, and because they possess good overall properties, including superior tear strength, flex life, heat resistance, and toughness. In film form, they can be coated onto fabric to impart these improved properties to said fabric. However, copolyetherester resins and resin blends suffer from, and their applications are limited by, their high flammability. This flammability problem is intensified when the copolyetherester exists as a film since the ratio of surface area to the volume of the thin film is larger, thereby allowing more exposure to oxygen, which is needed to support combustion.

Various flame retardants have been added to copolyetheresters, or copolyester elastomers, in order to reduce or eliminate flammability. The level and type of flame retardant additives used depends upon the thickness of the object and the chemical and physical interactions between the additives and the copolyetherester. Flame retardants that are effective in copolyetherester resins are not necessarily effective in copolyetherester films. For example, some known flame retardants, when added to the copolyetherester elastomers and formed into films, are often ineffective in the film due to their lack of sufficient activity to control burning of the film, which has a high surface area and which is very thin. Some flame retardants effective in copolyetherester molded shapes resin are ineffective in a film because they actually interfere with the making of the film, i.e., the resultant film is of poor quality. Many solid flame retardants, which are effective in non-film forms of copolyetheresters, also have a substantial detrimental effect on the water vapor transmission rate of the copolyester elastomers and as such, result in film having poor water vapor transmission rates. The preceding statement holds true even when the copolyester elastomer contains a high degree of chemical groups, such as residues of ethylene oxides, which cause the copolyester elastomers to have the characteristic of being readily permeable to water vapor. Finally, many solid flame retardants interfere with the physical properties, such as elongation, of the copolyetherester.

These problems become particularly important in copolyetherester films because the films are thin articles, having a high ratio of surface area to volume, and therefore the films require higher levels of flame retardants than do thick articles. However, the more flame retardant added to the thin film, the more likely it will interfere with the physical properties and the processing qualities of the film. For example, as more of the flame retardant is added interaction between the additive and the hydrophilic groups in the copolyetherester elastomer polymer may occur, depending upon the chemical nature of the additive, and this interaction can decrease the water vapor transmission rate of the film. As a result of the above problems, there exists a need for a flame retardant that can be added to a copolyetherester elastomer such that a good film, in terms of appearance, can still be formed with the flame retardant present and such that the flame retardant imparts good flame resistant properties into the film, and finally, such that the flame retardant does not interfere substantially with the physical properties, such as elongation or water vapor transmission rate, of the film.

The present invention alleviates the above problems by providing a waterproof, hydrophilic, breathable copolyetherester film that has a water vapor transmission rate greater than 6000 gm.mil/m$^2$/24 hrs., that has an elongation of greater than 600 percent, and that has good flame retardant properties. These flame resistant copolyetherester elastomer film compositions can further be bonded to a woven, non-woven, or knit fabric, which is of a stretch or non-stretch nature, to impart to the fabrics the superior properties associated with copolyetherester elastomers while at the same time eliminating the flammability problems associated with said elastomers. Such fabrics include nylon, poly(ethyleneterephthalate), polyaramid, polyurethane, polypropylene, or polyethylene. They can also be bonded to a layer of a hydrophobic copolyetherester elastomer, as described in Applicant's U.S. Pat. No. 4,725,481, the disclosure of which is incorporated herein by reference, which in turn can be bonded to a woven, non-woven, or knit fabric which is of a stretch or non-stretch nature. The flame retarded copolyetherester elastomer film compositions, when bonded to fabric, can be used to make breathable, flame resistant, water vapor permeable clothing, such as raincoats, jackets, and fireman turnout coats. The films can also be used for tents and other equipment which require flame resistant characteristics.

2. Description of Related Art

U.S. Pat. No. 4,166,743, granted Sept. 4, 1979 to Wortmann et al., discloses an intumescent flame-retardant coating composition comprising a film-forming agent, which is an aqueous synthetic resin dispersion, an ammonium polyphosphate, a substance carbonizable under heat, such as dicyandiamide, pentaerythritol, or melamine, and a dispersant, such as water, ethyl acetate, butyl acetate, xylene, or toluene. The coating additionally contains an ammonium polyphosphate activator, said activator being constituted by at least one salt which contains water of crystallization which is liberated upon the composition being heated to 35° C. to 250° C. This reference teaches film-forming agents such as aqueous, synthetic resin dispersions and solutions in organic solvent but no melt extrudable polymers are mentioned.

U.S. Pat. No. 4,395,511, granted July 26, 1983 to Tschirch et al., discloses flame retarded polyurethane compositions, wherein the flame retardant is selected from the group consisting of the mixture of decabromodiphenyl oxide and antimony oxide and the mixture of decabromodiphenyl oxide, antimony oxide, and ammonium polyphosphate. There is no mention of copolyetherester films in this reference, nor is there disclosed the particular flame retardant agent claimed in the film of the present invention.

U.S. Pat. No. 4,521,557, granted June 4, 1985 to McKenna, discloses flame retardant copolyetherester elastomer compositions containing effective concentrations of N, N,-ethylenebis(tetrabromophthalimide), antimony trioxide, and fumed silica. European Patent Application 0 149 190, published July 24, 1985 by General Electric Company, discloses a flame retardant low-modulus copolyetherester composition which includes a flame retarding amount of, amongst other types of flame retardants, an aromatic carbonate copolymer in which from 25 to 75 weight percent of the repeating units comprise chloro- or bromo- substituted dihydric phenol units and the remainder of the repeating units comprise dihydric phenol, glycol, or dicarboxylic acid. U.S. Pat. No. 4,582,866, granted Apr. 15, 1986 to Shain, discloses flame retardant thermoplastic multi-block copolyester elastomer compositions containing a bromine-containing flame retardant, antimony trioxide, and an organophilic clay. While the above references all disclose flame-retarded copolyetherester compositions, none disclose a copolyetherester film which is made flame retardant and which maintains good water vapor transmission rates and elongation values.

SUMMARY OF THE INVENTION

The present invention is directed to a flame resistant copolyetherester elastomer film composition comprising 60–85 weight percent of a hydrophilic copolyetherester elastomer film 0.3–1.6 mils thick and having a water vapor transmission rate of at least 6,000 gm.mil/m²/24 hrs, measured according to ASTM E96-66 (Procedure BW) at 72° F. and 50% RH, preferably at least 7,000 gm.mil/m²/24 hrs, said hydrophilic elastomer film consisting essentially of a multiplicity of long chain ester units and short chain ester units joined head-to-tail through ester linkages, said long chain ester units being represented by the formula

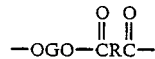

said short chain ester units represented by the formula

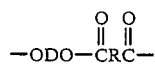

where G is a divalent radical remaining after the removal of terminal hydroxyl groups from a poly(alkylene oxide)glycol having an average molecular weight of about 400–3500 and, further, the poly(alkylene oxide)glycol contains sufficient units of ethylene oxide to incorporate in the resulting copolyetherester from about 25–68 weight percent units of ethylene oxide based on the total weight of the copolyetherester elastomer; R is a divalent radical remaining after the removal of carboxyl groups from a dicarboxylic acid having a molecular weight less than 300; D is a divalent radical remaining after the removal of hydroxyl groups from a diol having a molecular weight less than 250; the copolyetherester elastomer film contains about 25–80 weight percent short chain ester units, and incorporated in the hydrophilic copolyetherester film is 15–40 weight percent of a flame retardant component comprised of 37.5 to 100 weight percent of a brominated aromatic compound selected from the group consisting of tetradecabromodiphenoxybenzene, ethylenebistetrabromophthalimide, and decabromodiphenoxybenzene, wherein the weight percents of the hydrophilic copolyetherester elastomer film and the flame retardant component are based upon the weight of the film and flame retardant component only and provided that the ratio of the film thickness, in mils, to the weight percent of the brominated aromatic compound, as based upon the weight of the film and the total flame retardant component, is less than 0.04. Other additives may be included in the flame retardant component, such as zinc oxide, iron oxide, titanium dioxide, antimony oxide, tricresylphosphate, aluminum trihydrate, and zinc borate. The hydrophilic flame resistant copolyetherester films of the present invention may further be bonded to a woven, knit, or non-woven fabric, which is of a stretch or non-stretch nature, or bonded to a layer of a hydrophobic copolyetherester elastomer film, which in turn may be bonded to a woven, knit, or non-woven fabric, which is of a stretch or non-stretch nature. These flame resistant copolyetherester elastomer film compositions can be used to make breathable, water vapor permeable clothing, tents, etc.

DETAILED DESCRIPTION OF THE INVENTION

The present invention relates to waterproof hydrophilic, vapor permeable copolyetherester films that are flame resistant.

Specifically, the invention is a copolyetherester elastomer film composition comprised of (a) from 60–85 weight percent of a hydrophilic copolyetherester elastomer film 0.3–1.6 mils thick, preferably 0.5 to 1.3 mils thick, having a water vapor transmission rate of at least 6,000 gm.mil/m²/24 hrs., measured according to ASTM E96-66 (Procedure BW) at 72° F. and 50% RH, preferably 7,000 g.mil/m²/24 hrs., and an elongation of greater than 600 weight percent, as measured by ASTM D412, said hydrophilic elastomer film consisting essentially of a multiplicity of long chain ester units and short chain ester units joined head-to-tail through ester linkages, said long chain ester units being represented by the formula

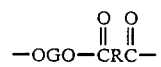

said short chain ester units represented by the formula

where G is a divalent radical remaining after the removal of terminal hydroxyl groups from a poly(alkylene oxide)glycol having an average molecular weight of about 400–3500 and, further, the poly(alkylene oxide)glycol contains sufficient units of ethylene oxide to incorporate in the resulting copolyetherester from about 25–68 weight percent units of ethylene oxide based on the total weight of the copolyetherester elastomer; R is a divalent radical remaining after the removal of carboxyl groups from a dicarboxylic acid having a molecular weight less than 300; D is a divalent radical remaining after the removal of hydroxyl groups from a diol having a molecular weight less than 250; the copolyetherester elastomer contains about 25–80 weight percent short chain ester units; and (b) from 15–40 weight percent of a flame retardant component comprised of 37.5 to 100 weight percent of at least one brominated aromatic compound selected from the group consisting of tetradecabromodiphenoxybenzene, ethylenebis-tetrabromophthalimide, and decabromodiphenoxybenzene, wherein the weight percents of component (a) and component (b) are based upon the total weight of component (a) and component (b) only and provided that the ratio of the film thickness, in mils, to the weight percent of the brominated aromatic compound, as based upon the weight of component (a) and component bb), is less than about 0.04.

The flame retardant component is used in the hydrophilic copolyetherester film to provide adequate flame resistance while, at the same time, maintaining the properties of the copolyetherester; specifically, the water vapor transmission rate for the hydrophilic copolyetherster elastomer film is maintained at least 6,000 gm.mil/m²/24 hrs., as measured according to ASTM E96-66 (Procedure BW) at 72° F. and 50% RH, and the elongation percent for said hydrophilic copolyetherester elastomer film is maintained at least 600, as measured according to ASTM D412. The flame retardant component must also not interfere with the physical appearance of the film, i.e., the film must have no visible holes in it. The flame retardant component used herein constitutes 15-40 weight percent of the flame resistant copolyetherester film composition, with the preferred weight range being 20-35 percent.

The flame retardant component must include at least 37.5 weight percent of at least one brominated aromatic compound selected from the group consisting of tetradecabromodiphenoxybenzene, ethylenebistetrabromophthalimide, and decabromodiphenoxybenzene. All of these compounds are commercially available. The weight percent of the brominated aromatic compound used is directly related to the thickness of the hydrophilic copolyetherester film. In order for the flame retardant component to act effectively, the ratio of the thickness, in mils, of the hydrophilic copolyetherester film to the weight percent of the brominated aromatic compound, as based upon the weight percent of the hydrophilic copolyetherester film and the flame retardant component, must be less than about 0.04. This is due to the fact that in a laminate, one surface of the film is exposed to air and is free to burn, while the other surface of the film is attached to the fabric, which acts as a heat sink to prevent combustion. As the film thickness increases, more polymer is available to support the combustion of the laminate. As such, a greater amount of the brominated aromatic compound is necessary to effectively impart flame resistance to the thicker film of hydrophilic copolyetherester film, as opposed to the thinner film.

The flame retardant component may be a single compound or it may be comprised of more than one compound. It is preferred that the flame retardant component be 100 weight percent of one of the brominated aromatic compounds. The most preferred composition for the flame retardant component is about 100 weight percent tetradecabromodiphenoxybenzene. If the flame retardant component is comprised of more than one compound, then there must be at least 37.5 weight percent, preferably greater than 60 weight percent, of at least one brominated aromatic compound selected from the group consisting of tetradecabromodiphenoxybenzene, ethylenebistetrabromophthalimide, and decabromodiphenoxybenzene. Aside from the brominated aromatic compounds listed above, the flame retardant component may be further comprised of no more than 62.5 weight percent, preferably no more than 40 weight percent, of a compound selected from the group consisting of metal oxides, aluminum trihydrate, zinc borate, tricresylphosphate, and triarylphosphate. The metal oxides include, but are not limited to, antimony oxide, zinc oxide, ferric oxide, and titanium dioxide. It is preferred that when the oxides are present, they constitute no more than 25 weight percent of the flame retardant component. The most preferred range is 7.5-15 weight percent of the flame retardant component. The preferred weight range for tricresyl phosphate is up to 12.5 weight percent, with the most preferred range being 2.5-7.5 weight percent, of the flame retardant component. All of the above compounds are commercially available.

The hydrophilic copolyetherester elastomer film component is 0.3-1.6 mils thick, preferably 0 5-1.3 mils thick, and has a water vapor transmission rate of at least 6,000 gm.mil/m²/24 hrs, measured according to ASTM E96-66 (Procedure BW) at 72° F. and 50% RH, preferably 7,000 gm.mil/m²/24 hrs. The hydrophilic copolyetherester elastomer film consists essentially of a multiplicity of long chain ester units and short chain ester units joined head-to-tail through ester linkages, said long chain ester units being represented by the formula

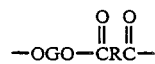

FORMULA (I)

and said short chain ester units represented by the formula

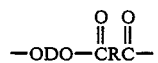

FORMULA (II)

where G is a divalent radical remaining after the removal of terminal hydroxyl groups from a poly(alkylene oxide)glycol, having an average molecular weight of about 400-3500, R is a divalent radical remaining after the removal of carboxyl groups from a dicarboxylic acid having a molecular weight less than 300, and D is a divalent radical remaining after the removal of hydroxyl groups from a diol having a molecular weight less than 250.

The term "long-chain ester units" as applied to units in a polymer chain refers to the reaction product of a long-chain glycol with a dicarboxylic acid. Such "long-chain ester units", which are repeating units in the copolyetheresters of this invention, correspond to Formula (I) above.

The long-chain glycols are polymeric glycols, specifically poly(alkylene oxide)glycols, having terminal (or as nearly terminal as possible) hydroxy groups. The poly(alkylene oxide)glycol used to make the hydrophilic copolyetherester elastomer must contain ethylene oxide groups in amounts sufficient to result in a copolyetherester having from about 25-68 weight percent ethylene oxide units based on the total weight of the copolyetherester elastomer. The ethylene oxide units cause the polymer to have the characteristic of being readily permeable to water vapor and, generally, the higher the percentage of ethylene oxide units in the copolyetherester, the higher the degree of water vapor permeability. Random or block copolymers of ethylene oxide containing minor portions of a second poly(alkylene oxide)glycol can be used. Generally, if a second monomer is present, the second monomer will constitute less than about 30 mol percent of the poly(alkylene oxide)glycols, and, usually, less than about 20 mol percent. Representative long-chain glycols used to prepare the copolyetherester elastomers that form the hydrophilic film have molecular weights of from 400-3500, usually 600-1500, and include: poly(ethylene oxide)glycol, ethylene-oxide capped poly(propylene oxide)glycol, mixtures of poly(ethylene oxide)glycol with other glycols such as ethylene oxide capped poly(propylene oxide)glycols and/or poly(tetramethylene oxide)glycol, provided that the resulting copolyetherester has an amount of ethylene oxide units of at least about 25 weight percent. Copolyetheresters prepared from poly(ethylene oxide)glycols and ethylene oxide capped poly(propylene oxide)glycol having a molecular weight of from about 400 to 3500, preferably from about 600 to 2500, and the proper ratio of glycols to give at least 25 weight percent ethylene oxide in the hydrophobic elastomer film with no additives are preferred. These are preferred because they provide a combination of superior water-vapor permeability and limited water swell. Furthermore, when formed into a film, they exhibit useful properties over a wide temperature range.

The term "short-chain ester units" as applied to units in a polymer chain of the copolyetheresters forming the hydrophilic film refers to low molecular weight compounds having molecular weights less than about 550. They are made by reacting a low molecular weight diol or a mixture of diols (MW below about 250) with a dicarboxylic acid to form ester units represented by Formula (II) above.

The low molecular weight diols which react to form short-chain ester units suitable for use for preparing copolyetheresters forming the hydrophilic film include acyclic, alicyclic and aromatic dihydroxy compounds. Included among the aromatic dihydroxy compounds which can be used are bis(p-hydroxy)diphenyl, bis(p-hydroxyphenyl)methane, and bis(p-hydroxyphenyl)propane. Preferred compounds are those diols with 2-15 carbon atoms, such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, most especially 1,4-butanediol. Equivalent ester-forming derivatives of diols are also useful (e.g., ethylene oxide or ethylene carbonate can be used in place of ethylene glycol). The term "low molecular weight diols" as used herein should be construed to include such equivalent esteforming derivatives; provided, however, that the molecular weight requirement pertains to the diol and not to its derivatives.

Dicarboxylic acids which are reacted with the foregoing long-chain glycols of Formula (I) above and low molecular weight diols of Formula (II) above to produce the copolyetheresters used in this invention for the hydrophilic film are aliphatic, cycloaliphatic or aromatic dicarboxylic acids of a low molecular weight, i.e., a molecular weight of less than about 300. The term "dicarboxylic acids" as used herein includes acid equivalents of dicarboxylic acids having two functional carboxyl groups which perform substantially like dicarboxylic acids in reaction with glycols and diols forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Representative aliphatic and cycloaliphatic acids which can be used are sebacic acid, 1,3-cyclohexanedicarboxylic acid, 1,4-cyclohexanedicarboxylic acid, adipic acid, glutaric acid, 4-cyclohexane-1,2-dicarboxylic acid, 2-ethylsuberic acid, cyclopentanedicarboxylic acid, decahydro-1,5-naphthylenedicarboxylic acid, 4,4'-bicyclohexyldicarboxylic acid, decahydro-2,6-naphthylenedicarboxylic acid, 4,4'-methylenebis(cyclohexyl)carboxylic acid, and 3,4'-furandicarboxylic acid. Preferred acids are cyclohexane-dicarboxylic acids and adipic acid.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring in present, they can be joined by aliphatic or aromatic divalent radicals or divalent radicals such as —O— or —SO$_2$—.

Representative aromatic dicarboxylic acids which can be used to make the copolyetheresters used to form films include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalenedicarboxylic acid, 2,7-naphthalenedicarboxylic acid, 4,4'-sulfonyldibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used provided an aromatic dicarboxylic acid is also present. Aromatic dicarboxylic acids are a preferred class for preparing the copolyetherester polymers useful for making the films of this invention. Among the aromatic acids, those with 8-16 carbon atoms are preferred, particularly terephthalic acid alone or with a mixture of phthalic and/or isophthalic acids.

The most preferred copolyetherester elastomers used to make the hydrophilic film are those prepared from esters of terephthalic acid, e.g., dimethylterephthalate, 1,4-butanediol and poly(ethylene oxide)glycol and ethylene oxide capped poly(propylene oxide)glycol.

The copolyetheresters used to make the hydrophilic film of the present invention contain about 25-80 weight percent short-chain ester units, preferably about 40-60 weight percent, corresponding to Formula (II) above, the remainder being long-chain ester units corresponding to Formula (I) above. When the copolyetherester elastomers used for the hydrophilic film contain less than about 25 weight percent short-chain ester units, then the crystallization rate becomes very slow and the copolyetherester is tacky and difficult to handle. When the copolyetherester elastomers used in hydrophilic films contain more than about 80 weight percent short chain-ester units, then the copolyetherester films are too stiff. The preferred balance of properties is obtained when the short-chain ester units are from about 40–60 weight percent.

In general, as percent short-chain ester units in the copolyetherester is increased, the polymer has a higher tensile strength and modulus, and the water vapor transmission rate decreases. Most preferably, for copolyetheresters forming the hydrophilic film, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-butylene radicals and D groups which are not 1,4-butylene radicals does not exceed 30%. If second dicarboxylic acid is used to make the copolyetherester, isophthalic acid is the acid of choice and if a second low molecular weight diol is used, 1,4-butanediol of hexamethylene glycol are the diols of choice.

The hydrophilic layer can be a blend or mixture of two or more copolyetherester elastomers. The copolyetherester elastomers used in the blend need not on an individual basis come within the value disclosed hereinabove for the elastomers. However, the blend of two or more copolyetherester elastomers that forms the hydrophilic layer must conform to the values described herein for the copolyetheresters on a weighted average basis. For example, in a mixture used to make a hydrophilic layer that contains equal amounts of two copolyetherester elastomers, one copolyetherester can contain 60 weight percent short-chain ester units and the other copolyetherester can contain 30 weight percent short-chain ester units for a weighted average of 45 weight percent short chain ester units in the hydrophilic layer.

The Young's moduli of the copolyetherester elastomers used to make the hydrophilic film preferably are from 1000 to 14,000 psi, usually 2000 to 10,000 psi, as determined by ASTM Method D-412. The modulus can be controlled by the ratio of short-chain segments to long-chain segments of the copolyetherester elastomer, and comonomer choice for preparation of the copolyetherester. The importance of using copolyetheresters having a relatively low modulus is to achieve better stretch recovery and aesthetics of the composite structure when attached to textile materials for the manufacture of wearing apparel, such as jackets and raincoats, where the stiffness and drape of the garment are important for comfort.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol. The copolyetherester elastomers used to make the hydrophilic film described herein can be made conveniently by a conventional ester interchange reaction. A preferred procedure involves heating the ester of an aromatic acid, e.g., dimethyl ester of terephthalic acid, with the poly(alkylene oxide)glycol and a molar excess of the low molecular weight diol, 1,4-butanediol, in the presence of a catalyst at 150°–260° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously, the prepolymer might also be prepared by running these processes in the presence of the long-chain glycol.

The resulting prepolymer is then carried to high molecular weight by distillation of the excess of short-chain diol. This process is known as "polycondensation." Additional ester interchange occurs during this distillation to increase the molecular weight and to randomize the arrangement of the copolyetherester units. Best results are usually obtained if this final distillation or polycondensation is run at less than 1 mm pressure and 240°–260° C. for less than 2 hours in the presence of antioxidants such as 1,6-bis-[3,5-di-tert-butyl-4-hydroxyphenol) propionamido]-hexane or 1,3,5-trimethyl-2,4,6-tris[3,5-ditertiary-butyl-4hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Preferably, the melting point of the copolyetherester of the hydrophilic elastomers is greater than 120° C., usually from about 120° C. to above about 220° C. If the melting point of the copolyetherester is less than about 120° C., then the polymer is tacky and difficult to handle in film form; and if the melting point is more than about 220° C., then the films become excessively stiff. The melting points are determined by differential scanning calorimeter (DSC).

Although the copolyetheresters possess many desirable properties, it is sometimes advisable to stabilize these compositions further against heat or light produced degradation. Fortunately, this can be done very readily by incorporating stabilizers in the copolyetherester compositions. Satisfactory stabilizers comprise phenols, especially hindered phenols and their derivatives, amines and their derivatives, especially arylamines. Representative phenol derivatives useful as stabilizers include 4,4'-bis(2,6-di-tertiary-butylphenol); 1,3,5-trimethyl-2,4,6-tris[3,5-ditertiary-butyl-4-hydroxybenzyl]benzene and 1,6-bis[3,5-di-tert-butyl-4-hydroxyphenyl)propionamido] hexane. Mixtures of hindered phenols with costabilizers such as dilaurylthiodipropionate or phosphites are particularly useful. Improvement in light stability occurs by the addition of small amounts of pigments or the incorporation of a light stabilizer, such as benzotriazole ultraviolet light absorbers. The addition of hindered amine photostabilizers, such as bis(1,2,2,6,6-pentamethyl-4-piperidinyl) n-butyl-(3,5-di-tert-butyl-4-hydroxybenzyl)malonate, usually in amounts of from 0.05–1.0% by weight of the copolyetherester, are particularly useful in preparing compositions having resistance to photodegradation.

Various conventional fillers can be added to the copolyetheresters usually in amounts of from about 1–10 percent by weight of the copolyetherester film. Fillers such as clay, talc, alumina, carbon black, silica can be used, the latter being preferred, and white and light colored pigments can be added to the polymers. In general, these additives have the effect of increasing the modulus at various elongations. It is advantageous to add the inorganic filler in finely divided form to the hydrophilic copolyetherester used to make apparel and the like to improve the slip and blocking characteristics of the hydrophilic layer to give improved sewability and aesthetics without sacrificing the integrity of adhesion of the layer to the textile material.

The flame resistant copolyetherester elastomer film composition can be prepared by dry blending the copolyetherester (moisture content less than 0.1%) with the appropriate amount of flame retardant component in any suitable blender, such as a drum tumbler, double cone, etc. The dry blended mixture is then fed into an extruder capable of providing a uniform dispersion (particulate agglomerates small enough to pass through a 150 mesh screen) of the flame retardant component in the polymer matrix. The molten flame resistant polymer may be converted to pellets for extrusion into film in a subsequent step or it may be extruded directly as a film for lamination onto a fabric or it may be extrusion melt coated onto a fabric to form the laminate. The extrusion temperatures should be set 5° to 30° C. above the melting point of the copolyetherester, with the extrusion die gap set at 15 to 40 times the desired film thickness. To produce film for subsequent lamination, a quench drum, maintained at or below a temperature which is 100° C. below the polymer melting point, is employed on the melt extrudate. To produce a melt coated fabric, it is necessary to maintain the flame resistant polymer extrudate above the crystallization temperature of the copolyetherester prior to bringing the polymer melt and fabric into contact. The fabric may be heated to promote adhesion or a thermally activated flame retarded adhesive may be pre-applied to the fabric.

The preferred fabric or textile material, to which the flame resistant film composition is bonded is a non-woven, woven, or knit, apertured or non-apertured, stretch or non-stretch, polyaramid fabric. When the fabric is apertured, hot gases can penetrate the fabric and when the fabric is non-apertured, the penetration of the hot gases is significantly decreased. Fabrics are formed without apertures by proper control of the hydraulic needling conditions of which they are prepared. Hydraulic needling is the hydraulic entangling of fabric batts to form spunlaced fabric. The process by which the spunlaced fabric is prepared without apertures is described in Bunting et al., U.S. Pat. No. 3,508,308. The non-apertured polyaramid fabric is described in Blaustein et al., U.S. Pat. No. 4,750,443, the disclosure of which is incorporated herein by reference. For a non-woven, stretch or non-stretch, polyaramid fabric, the layer of polyaramid fiber is either an apertured or non-apertured hydraulically needled batt that weighs in the range of 0.7 to 3 oz/yd$^2$ (about 21 to 100 g/m$^2$), preferably in the range of 0.9 to 2.7 oz/yd$^2$ (about 30 to 90 g/m$^2$). For a knit or woven, stretch or non-stretch, polyaramid fabric, the layer of polyaramid fiber weighs in the range of 1.2 to 9 oz/yd$^2$ (about 5 to 30 g/m$^2$), preferably 1.6 to 7 oz/yd$^2$ (about 54 to 240 g/m$^2$). The polyaramid fiber in the knit, woven, or non-woven fabric consists essentially of 0 to 100 weight percent of poly(p-phenylene terephthalamide) staple fibers and 0 to 100 weight percent of poly(m-phenylene isophthalamide) staple fibers. Preferred fabrics, either woven, non-woven, or knit, are those in which the fabric layer consists essentially entirely of 100 weight percent poly(m-phenylene isophthalamide) fiber or poly(p-phenylene terephthalamide) fiber. Other preferred fabrics are those in which the fabric layer consists essentially of 5 to 33 weight percent poly(p-phenylene terephthalamide) fibers and 67 to 95 weight percent poly(m-phenylene isophthalamide) fibers, with the most preferred weight range being 5 to 15 and 85 to 95, respectively. The most preferred fabric is a non-woven, apertured or non-apertured, stretch or non-stretch fabric of polyaramid fiber.

The thermally activated flame retarded adhesive used to bond the flame resistant copolyetherester elastomer film composition to the fabric is preferably polyurethane based or polyester based. The most preferred flame retarded adhesive is polyester based. The preferred flame retarded polyester based adhesive consists essentially of 15 to 30 weight percent decabromodiphenyl oxide and 5 to 10 weight percent antimony oxide, wherein the preferred polyester is a copolymer of terephthalic acid, isophthalic acid, and butanediol. There are a number of these flame retarded polyester based adhesives commercially available. Those with a melting range of 110° to 150° C. are preferred. A representative sample of such a preferred adhesive is Griltex 8P, a commercial product manufactured by Emser Industries.

If it is desired to make the flame resistant copolyetherester film into a bicomponent film where one layer, or component, is that of the present invention and the other layer, or component, is a hydrophobic layer, then process followed is the same as that disclosed in Applicant's U.S. Pat. No. 4,725,481, previously incorporated herein by reference. Specifically, the flame resistant hydrophilic copolyetherester film is coated onto a hydrophobic copolyetherester film through coextrusion. The flame resistant hydrophilic copolyetherester film, and additives, if any, is fed into one extruder and the hydrophobic copolyetherester film, and additives, if any, is fed into a second extruder. The polymers in the extruders are heated above their melting points, which should differ by at least about 10° C. when a textile material is to be melt bonded to the hydrophobic layer, and each layer is passed to a conventional melt combining block connected to the extruders where the extruded layers are contracted one on top of the other. The layers then pass through a flat die connected to the combining block where the coextruded layers adhere to each other and form a bicomponent film structure, wherein the hydrophilic layer is flame retarded. The bicomponent film coming out of the die is melt coated on a support substrate, such as lightweight polyester film, release paper, etc. and the bicomponent film is wound and stored for use.

If it is desired to make either the flame resistant hydrophilic film or the flame resistant bicomponent film into a raincoat, jacket or other garment, or tent, etc., the film is bonded to a knit, woven or non-woven, stretch or non-stretch textile material, such as poly(ethylene terephthalate), nylon, polyaramid, polyurethane, polypropylene, or polyethylene, using the thermally activated flame retarded adhesive. The amount of adhesive used is dependent upon the fabric to which the hydrophilic flame resistant copolyetherester elastomer film is to be bonded. If too much adhesive is used to bond the film to the fabric, then the flame retardant effect may be diminished. If not enough adhesive is used to bond the film to the fabric, then the wash durability of the film-fabric laminate may decrease and there may be de-lamination over time. For the non-woven polyaramid fabric previously described, in which the apertured or non-apertured layer consisted essentially of 0-100 weight percent poly(p-phenylene terephthalamide) fibers and 0-100 weight percent poly(m-phenylene isophthalamide) fiber, the preferred flame retarded adhesive is a polyester based adhesive with a melting range of 110° to 150° C., the additives in which consist essentially of 15 to 30 weight percent decabromodiphenyl oxide, and 5 to 10 weight percent antimony oxide, and it is present at 0.3 to 1.0 oz/yd$^2$, preferably 0.3 to 0.6 oz/yd$^2$ of the flame resistant copolyetherester film composition. The film to fabric lamination is prepared by thermal lamination of the film on hot roll calendaring equipment. When a bi-component film, consisting essentially of a hydrophobic film layer and the flame resistant hydrophilic copolyetherester film layer is bonded to a fabric, the hydrophobic layer of the film should be closest to the textile material, with the flame retardant adhesive being between the hydrophobic film layer and the fabric.

EXAMPLES

The ingredients used in the following examples are listed below:

The copolyetherester forming the hydrophilic layer contains 45 weight percent 1,4-butylene terephthalate, 33 weight percent poly(ethylene oxide) terephthalte and 22 weight percent ethylene oxide/propylene oxide copolyether terephthalate. The poly(alkylene oxide)-glycol used to make the copolyetherester has a molecular weight of 2000. The copoly(alkylene oxide)glycol used to make the copolyether ester has a molecular weight of 2150. The copolyether ester has a calculated ethylene oxide content of 36.6% and contains 50% short-chain ester units. The polymer has a melting point of 198° C. and a WVTR of 14000 gm.mil/m$^2$/24 hrs.

The flame retardant additives:
A = tetradecabromodiphenoxybenzene
B = ethylenebistetrabromophthalimide
C = decabromodiphenoxybenzene
D = zinc oxide
E = ferric oxide
F = tricresylphosphate
G = 60:40 antimony oxide:polyetherester The flame retardant adhesive (FRA) is a polyester based adhesive, Griltex 8P, sold commercially by Emser Industries, having a melting point of 135° C. and containing 15 to 30 weight percent decabromodiphenyl oxide and 5 to 10 weight percent antimony oxide.

The fabric:
NA = non-apertured, non-woven fabric consisting of 10 weight percent poly(p-phenylene terephthalamide) and 90 weight percent poly(m-phenylene isophthalamide) fabric, weighing 0.9 oz/yd$^2$
AP = apertured, non-woven fabric consisting of 10 weight percent poly(p-phenylene terephthalamide and 90 weight percent poly(m-phenylene isophthalamide) fabric, weighing 0.9 oz/yd$^2$ The examples below were all prepared by drying the hydrophilic copolyetherester pellets at 100° C in a vacuum oven for 8 hours and then dry blending a specified amount of flame retardant component, as described below, with the polymer pellets. The dry blended mixture was fed into a Werner Pfleiderer 28 mm twin screw extruder equipped with a vacuum port and a 10 inch wide vertical extrusion die with the die gap set at 205° C. A screw speed of 80 rpm was used to mix the ingredients and feed the polymer melt to the die. The melt extrudate was quenched and formed into a thin film (0.0008 inches thick) on a rotating drum maintained at a temperature of 60° C.

The film was then laminated onto fabric, 8 inches square, by first applying 0.5 oz/yd$^2$ of the flame retardant adhesive (FRA) between the fabric and the hydrophilic copolyetherester elastomer film and then heating the samples of the film. The film to fabric laminates were produced on a Model P-2160 PHI Laboratory press, at a temperature of 150° C. and a pressure of 5 psi, held for 10 seconds.

The effectiveness of the flame retardant component in improving the flame resistant behavior of the copolyetherester film, as applied to a laminate, was determined by igniting, for 8–10 seconds, the bottom portion of a strip of the film-fabric laminate, which was 8 inches long, 6 inches wide, and hung in a vertical position. The length of the laminate charred by the flame was used as a measure of flame retardant efficiency. Samples having burn lengths of greater than 4 inches (i.e., greater than 50% burned) were judged as having poor flame retardant properties. This is referred to as "BURN" in the data tables that follow.

The water vapor transmission rate of the flame resistant copolyetherester film was measured in accordance with the ASTM E96BW procedure at 73° F. and 50% RH.

The elongation percent of the hydrophilic flame retarded copolyetherester film was determined in accordance with ASTM D412.

The quality of the flame resistant copolyetherester film was judged as good if the film could be extruded without producing holes, visible to the naked eye, in the quenched film.

The thickness of the flame resistant copolyetherester film was measured using an Oni-Soki electronic thickness gauge and taking an average of three readings per test specimen used to normalize film water vapor transmission values.

In examples that follow, all weight percents are based upon the total of all components listed.

copolyetherester elastomer film. The data, as compiled in Table 1, below, shows that in all cases where the weight ratio of film thickness to weight percent brominated aromatic flame retardant was less than about 0.04, the burn length of the film-fabric laminate was less than 4 inches and the water vapor transmission rate and the elongation percent of the film were held above 6,000 and 600, respectively. Comparison of example 1 with example 2 shows that where the ratio of film thickness to weight percent brominated aromatic flame retardant is greater than about 0.04, there is a detrimental effect on the burn length of the film-fabric laminate. This trend is also exhibited in examples 7 and 12, where the ratio of film thickness to weight percent of brominated aromatic flame retardant was greater than 0.04 and the burn length for the film-fabric laminate was greater than 4 inches. Examples 10 and 11 show that poor film quality has a detrimental effect on the elongation of the flame resistant, hydrophilic, copolyetherester film. In all cases where the desired ratio and weight percent components were achieved, the flame resistance, or burn length, of the sample was improved with the use of the flame resistant copolyetherester film composition.

TABLE 1

Brominated Aromatic Compounds in Hydrophilic Copolyetherester Films

| Example No. | Wt % CPEE | Wt % BAC | Film Thickness (mils) | Ratio[1] | Burn NA (in.) | Burn AP (in.) | Elongation (%) | WVTR[2] | WVTR (/mil) | Film Quality |
|---|---|---|---|---|---|---|---|---|---|---|
| 1 | 85 | 15A | 0.45 | .03 | 2.2 | 4 | 650 | 16370 | 7370 | Good |
| 2 | 85 | 15A | 0.75 | .05 | >4 | >4 | 874 | 17164 | 12873 | Good |
| 3 | 80 | 20A | 0.75 | .038 | 2.8 | 2.3 | 835 | 17390 | 3040 | Good |
| 4 | 75 | 25A | 0.95 | .038 | 3.0 | 2.2 | 819 | 13530 | 12850 | Good |
| 5 | 70 | 30A | 0.85 | .028 | 2.2 | 2.1 | 798 | 18600 | 15810 | Good |
| 6 | 65 | 35A | 0.75 | .021 | 2.3 | 2.2 | 752 | 18000 | 13500 | Good |
| 7 | 85 | 15B | 0.75 | .05 | 1.8 | >4 | 1128 | 10340 | 7755 | Good |
| 8 | 75 | 25B | 0.75 | .03 | 1.9 | 1.9 | 956 | 13340 | 10005 | Good |
| 9 | 65 | 35B | 0.75 | .02 | 1.5 | 1.5 | 756 | 12960 | 9720 | Good |
| 10 | 55 | 45B | 0.7 | .016 | 1.7 | 1.7 | 581 | 13260 | 9282 | Poor |
| 11 | 45 | 55B | 1.5 | .027 | — | — | 121 | 9280 | 13920 | Poor |
| 12 | 85 | 15C | 0.95 | .06 | 2.6 | >4 | 1106 | 14700 | 13965 | Good |
| 13 | 75 | 25C | 0.85 | .034 | 1.8 | 1.5 | 863 | 11970 | 10175 | Good |
| 14 | 65 | 35C | 0.7 | .02 | 1.6 | 2.0 | 739 | 11820 | 8274 | Good |
| 15 | 55 | 45C | 0.9 | .02 | — | — | 204 | 11140 | 10026 | Poor |

Legend
CPEE = hydrophilic copolyetherester elastomer film
BAC = brominated aromatic compound
Ratio[1] = [Film Thickness (mils)]/Wt. % BAC
NA = non-apertured fabric
AP = apertured fabric
WVTR[2] = water vapor transmission rate (gm.mil/m$^2$/24 hrs.)

Examples C1–C3: Control Examples

Burn tests were run on three control examples. A film consisting entirely of the copolyetherester failed the burn test, i.e., the sample burned greater than four inches. The fabric, as used in all the examples, either apertured or not, burned 2.5 inches. The fabric and the adhesives, as used in all the examples, burned 3.2 inches. The examples that follow show that the flame resistant copolyetherester film acts not only to contribute properties of a copolyetherester, such as good water vapor transmission rate and good elongation, to the fabric, but it also acts to improve the overall flame resistance of the fabric.

Examples 1–15: Brominated Aromatic Compounds in Hydrophilic Copolvetherester Films In examples 1–15, either tetradecabromodiphenoxybenzene, ethylenebistetrabromophthalimide, or decabromodiphenoxybenzene was added to the hydrophilic

Examples 16–26: Brominated Aromatic Compounds Plus Other Additives in Hydrophilic Copolyetherester Films In examples 16–26, other additives were included with the brominated aromatic compound to create the flame retardant component for the hydrophilic copolyetherester film. Particularly, these other additives were zinc oxide, ferric oxide, antimony oxide, and tricresylphosphate. The data is tabulated in Table 2, below. Examples 16, 17 and 21 again show that the burn length of the fabric is detrimentally affected when there is an insufficient amount of brominated aromatic compound, as based upon the film thickness. Example 18 shows that where the film quality itself is poor, the desired properties will not be obtained. In all cases where the desired parameters were achieved, the flame resistant copolyetherester film composition reduced the burn length of the sample.

We claim:

TABLE 2
Brominated Aromatic Compounds Plus Other Additives in Hydrophilic Copolyetherester Films

| Example No. | Wt % CPEE | Wt % BAC | Wt % Other | Film Thickness (mils) | Ratio[1] | Burn NA (in.) | Burn AP (in.) | Elongation (%) | WVTR[2] | WVTR (/mil) | Film Quality |
|---|---|---|---|---|---|---|---|---|---|---|---|
| 16 | 85 | 12A | 3D | .85 | .07 | >4 | >4 | 1060 | 15350 | 13050 | Good |
| 17 | 85 | 12A | 3E | .7 | .06 | >4 | >4 | 862 | 15840 | 11088 | Good |
| 18 | 79 | 15A | 6D | 0 | — | — | — | 0 | 0 | 0 | Poor |
| 19 | 70 | 24A | 6D | 0.8 | .03 | 2.0 | 3.2 | 933 | 14510 | 11608 | Good |
| 20 | 70 | 24A | 6E | 0.8 | .03 | 1.7 | 3.2 | 858 | 8750 | 7000 | Good |
| 21 | 83.5 | 15A | 1.5F | 0.65 | .04 | 2.2 | 4 | 858 | 17880 | 11622 | Good |
| 22 | 78 | 20A | 2F | 0.65 | .03 | 2.1 | 2 | 675 | 14470 | 9405 | Good |
| 23 | 72.5 | 25A | 2.5F | 0.8 | .03 | 3.0 | 2.6 | 869 | 16980 | 13584 | Good |
| 24 | 67 | 30A | 3F | 0.45 | .02 | 2.5 | 2 | 712 | 14701 | 6620 | Good |
| 25 | 61.5 | 35A | 3.5F | 0.8 | .023 | 1.9 | 2 | 723 | 17090 | 13672 | Good |
| 26 | 66 | 24A | 10G | 0.8 | .03 | 1.3 | 1.5 | 852 | 14820 | 11856 | Good |

Legend
CPEE = hydrophilic copolyetherester elastomer film
BAC = brominated aromatic compound
Other = other flame retardant additive
Ratio[1] = [Film Thickness (mils)]/Wt. % BAC
NA = non-apertured fabric
AP = apertured fabric
WVTR[2] = water vapor transmission rate (gm. mil/m²/24 hrs)

1. A flame resistant copolyetherester elastomer film composition comprising
   (a) 60–85 weight percent of a hydrophilic copolyetherester elastomer film having a thickness of 0.3–1.6 mils, a water vapor transmission rate of at least 6,000 gm.mil/m²/24 hours and an elongation of at least 600% with said hydrophilic elastomer film consisting essentially of a multiplicity of long chain ester units and short chain ester units joined head-to-tail through ester linkages, said long chain ester units being represented by the formula

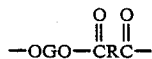

and said short chain ester units represented by the formula

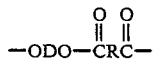

where G is a divalent radical remaining after the removal of terminal hydroxyl groups from a poly(alkylene oxide)glycol having an average molecular weight of about 400–3500 and, further, the poly(alkylene oxide)glycol contains sufficient units of ethylene oxide to incorporate in the resulting copolyetherester from about 25–68 weight percent units of ethylene oxide based on the total weight of the copolyetherester elastomer; R is a divalent radical remaining after the removal of carboxyl groups from a dicarboxylic acid having a molecular weight less than 300; D is a divalent radical remaining after the removal of hydroxyl groups from a diol having a molecular weight less than 250; the copolyetherester elastomer contains about 25–80 weight percent short chain ester units, and
   (b) 15–40 weight percent of a flame retardant component comprised of 37.5 to 100 weight percent of a brominated aromatic compound selected from the group consisting of tetradecabromodiphenoxybenzene, ethylenebistetrabromophthalimide, and decabromodiphenoxybenzene, wherein the weight percents for component (a) and component (b) are based upon the weight of (a) and (b) only and provided that the ratio of the film thickness, in mils, to the weight percent of the brominated aromatic compound, as based upon the weight of (a) and (b), is less than about 0.04.

2. The flame resistant copolyetherester elastomer film composition of claim 1 wherein the flame retardant component is present at 20–35 weight percent of component (a) and component (b).

3. The flame resistant copolyetherester elastomer film composition of claim 1 wherein the flame retardant component is 100 weight percent tetradecabromodiphenoxybenzene.

4. The flame resistant copolyetherester elastomer film composition of claim 1 wherein the flame retardant component is 100 weight percent ethylenebistetrabromophthalimide.

5. The flame resistant copolyetherester elastomer film composition of claim 1 wherein the flame retardant component is 100 weight percent decabromodiphenoxybenzene.

6. The flame resistant copolyetherester film composition of claim 1 wherein the brominated aromatic compound is present at 60 to less than 100 weight percent of the flame retardant component.

7. The flame resistant copolyetherester elastomer film composition of claim 1 wherein the flame retardant component is further comprised of no more than 62.5 weight percent of at least one compound selected from the group consisting of metal oxides, tricresylphosphate, aluminum trihydrate, and zinc borate.

8. The flame resistant copolyetherester elastomer film composition of claim 7 wherein the metal oxides are selected from the group consisting of zinc oxide, iron oxide, titanium dioxide and antimony oxide.

9. The flame resistant copolyetherester elastomer film composition of claim 7 wherein the metal oxides constitute up to 25 weight percent of the flame retardant component.

10. The flame resistant copolyetherester elastomer film composition of claim 7 wherein the tricresylphosphate constitutes up to 12.5 weight percent of the flame retardant component.

11. The flame resistant copolyetherester elastomer film composition of claim 1 bonded to a continuous layer of a hydrophobic copolyetherester elastomer film having a thickness of 0.05–0.8 mils and a water vapor transmission rate of 400–2500 gm.mil/m2/24 hrs. according to ASTM E96–66 (Procedure BW), said hydrophobic elastomer being a copolyetherester elastomer or a mixture of two or more copolyetherester elastomers having a multiplicity of recurring long-chain ester units and short-chain ester units joined head-to-tail through ester linkages, said long-chain ester units being represented by the formula

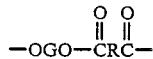

and said short-chain ester units being represented by the formula:

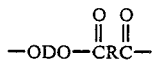

where G is a divalent remaining after the removal of terminal hydroxyl groups from a poly(alkylene oxide)-glycol having an average molecular weight of about 400–3500, and further, the amount of ethylene oxide groups incorporated in the copolyetherester or mixture of two or more copolyetheresters by the poly(alkylene oxide)glycol is not greater than about 20 weight percent based upon the total weight of the copolyetherester or mixture of two or more copolyetheresters; R is a divalent radical remaining after removal of carboxyl groups from a dicarboxylic acid having a molecular weight less than 300; D is a divalent radical remaining after removal of hydroxyl groups from a diol having a molecular weight less than about 250; and said hydrophobic copolyetherester or mixture of two or more copolyetheresters has from about 25–80 weight percent short-chain ester units.

12. The flame resistant copolyetherester elastomer film composition of claim 1 bonded with a flame retardant adhesive to a woven, non-woven, or knit, stretch or non-stretch, textile material.

13. The flame resistant copolyetherester elastomer film composition of claim 11 bonded with a flame retardant adhesive to a woven, non-woven, or knit, stretch or non-stretch, textile material.

14. The flame resistant copolyetherester elastomer film composition of claim 12 or 13 wherein the textile material is bonded to the flame retarded copolyetherester film with 0.3 to 1.0 oz/yd$^2$ of a flame retarded adhesive which is polyester based and which has additives consisting essentially of 15 to 30 weight percent decabromodiphenyl oxide and 5 to 10 weight percent antimony oxide.

15. The flame resistant copolyetherester elastomer film composition of claims 12 or 13 wherein the textile material is a non-woven layer, apertured or non-apertured hydraulically needled batt weighing in the range of 0.7 to 3 oz/yd$^2$ and consisting essentially of 0 to 100 weight percent of poly(p-phenylene terephthalamide) staple fibers and 0 to 100 weight percent of poly(m-phenylene isophthalamide) staple fibers.

16. The flame resistant copolyetherester elastomer film composition of claim 15 wherein the non-woven layer consists essentially of 5 to 33 weight percent poly(p-phenylene terephthalamide) fibers and 67 to 95 weight percent poly(m-phenylene isophthalamide) fibers.

17. The flame resistant copolyetherester film composition of claim 15 wherein the non-woven layer consists essentially of about 100 weight percent poly(p-phenylene terephthalamide).

18. The flame resistant copolyetherester film composition of claim 15 wherein the non-woven layer consists essentially of about 100 weight percent poly(m-phenylene isophthalamide) fiber.

19. The flame resistant copolyetherester elastomer film composition of claims 12 or 13 wherein the textile material is a woven or knit layer, weighing in the range of 1.2 to 9 oz/yd$^2$ and consisting essentially of 0 to 100 weight percent of poly(p-phenylene terephthalamide) staple fibers and 0 to 100 weight percent poly(m-phenylene isophthalamide) staple fibers.

20. The flame resistant copolyetherester elastomer film composition of claim 19 wherein the woven or knit layer consists essentially of 5 to 33 weight percent poly(p-phenylene terephthalamide) fibers and 67 to 95 weight percent poly(m-phenylene isophthalamide) fibers.

21. The flame resistant copolyetherester elastomer film composition of claim 19 wherein the woven or knit layer consists essentially of about 100 weight percent poly(p-phenylene terephthalamide) fiber.

22. The flame resistant copolyetherester elastomer film composition of claim 19 wherein the woven or knit layer consists essentially of about 100 weight percent poly(m-phenylene isophthalamide film).

* * * * *

UNITED STATES PATENT AND TRADEMARK OFFICE
CERTIFICATE OF CORRECTION

PATENT NO. : 4,908,260
DATED : March 13, 1990
INVENTOR(S) : Harshad R. Dodia; George J. Ostapchenko It is certified that error appears in the above—identified patent and that said Letters Patent is hereby corrected as shown below:

In the Claims:
Claim 11:
Col. 19, line 24, after the word divalent insert --radical--.

Signed and Sealed this

Twenty-seventh Day of November, 1990

Attest:

HARRY F. MANBECK, JR.

Attesting Officer      Commissioner of Patents and Trademarks